United States Patent
Yoshihara

(10) Patent No.: US 8,594,165 B2
(45) Date of Patent: Nov. 26, 2013

(54) HALF-SYMBOL CONSTELLATION DISPLAY

(75) Inventor: Koichi Yoshihara, Tokyo (JP)

(73) Assignee: Tektronix International Sales GmbH, Rheinfall (CH)

( * ) Notice: Subject to any disclaimer, the term of this patent is extended or adjusted under 35 U.S.C. 154(b) by 2240 days.

(21) Appl. No.: 10/613,577

(22) Filed: Jul. 2, 2003

(65) Prior Publication Data

US 2005/0002451 A1    Jan. 6, 2005

(51) Int. Cl.
*H04B 17/00* (2006.01)
*H04B 3/46* (2006.01)
*H04Q 1/20* (2006.01)

(52) U.S. Cl.
USPC ............ 375/224; 375/228; 375/295; 375/296

(58) Field of Classification Search
USPC .................................. 375/224, 228, 295, 296
See application file for complete search history.

(56) References Cited

U.S. PATENT DOCUMENTS

| | | | | |
|---|---|---|---|---|
| 4,756,011 | A * | 7/1988 | Cordell | 375/371 |
| 4,825,449 | A * | 4/1989 | McKissock | 375/228 |
| 5,920,220 | A * | 7/1999 | Takao et al. | 327/233 |
| 7,031,405 | B1 * | 4/2006 | Touzni et al. | 375/326 |

OTHER PUBLICATIONS

Agilent Technologies, "Testing and Troubleshooting Digital RF Communications Receiver Designs", Application Note 1314, www.agilent.com, Mar. 25, 2002.
Anritsu Corporation, "Product Introduction, MS8608A/MS8609A, Digital Mobile Radio Transmitter Tester (GSM, EDGE), Measurement Solutions", Copyright 2002.
Kamilo Feher, "Wireless Digital Communications", Prentice Hall, May 17, 1995.

* cited by examiner

*Primary Examiner* — Ted Wang
(74) *Attorney, Agent, or Firm* — Francis I. Gray; Michael A. Nelson; Marger Johnson & McCollom PC

(57) ABSTRACT

A half-symbol constellation display for readily providing better observability of signal distortions in a modulated signal representing symbols of information uses a sample clock derived from a symbol clock for the modulated signal, the sample clock having the same period as the symbol clock but being shifted one-half period in phase with respect to the symbol clock. Quadrature component signals of the modulated signal are sampled using the sample clock to produce sample pairs, referred to as pseudo-symbols, that are symmetric about a symbol sample point. The pseudo-symbols form a plurality of clusters when displayed on a quadrature coordinate plane, with the diameter of each cluster being determined by the outer pseudo-symbols for the corresponding symbols. The circumferences of such clusters for an ideal modulated signal may be displayed as a template to make it easier to recognize the shift of the pseudo-symbols from the ideal locations due to distortions in the modulated signal.

6 Claims, 13 Drawing Sheets

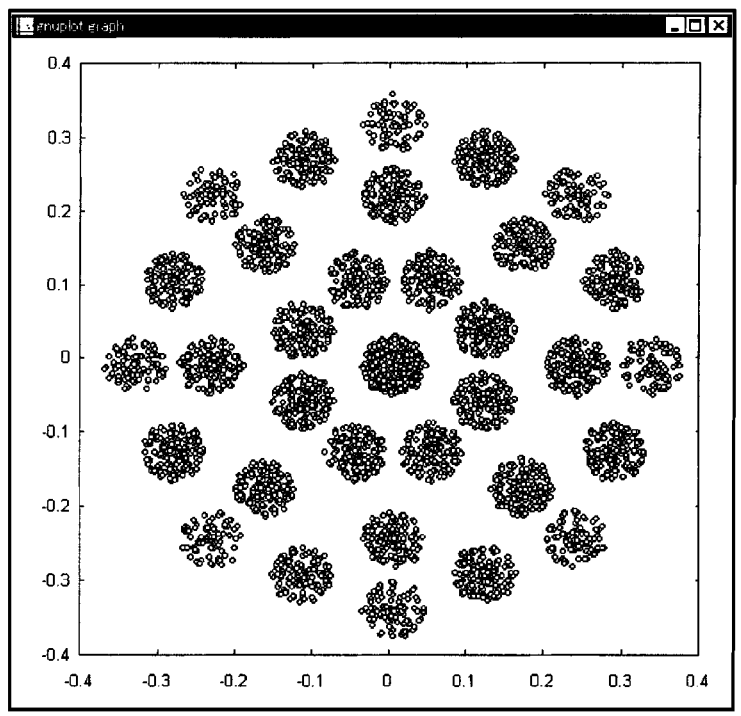
FIG.13
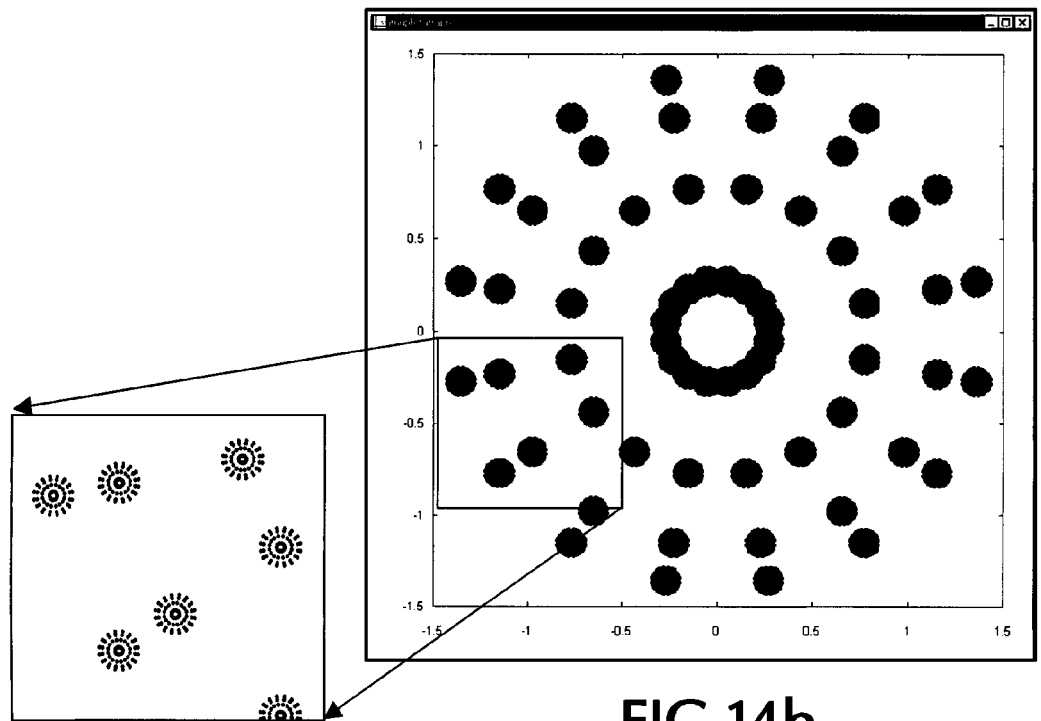
FIG.14a
FIG.14b

HALF-SYMBOL CONSTELLATION DISPLAY

BACKGROUND OF THE INVENTION

The present invention relates to the testing and analysis of digital RF communications systems, and more particularly to a half-symbol constellation display that allows a user to easily recognize distortions in a modulated wireless communication signal.

There are various wireless communication systems that use different digital modulation formats. One such modulation format is the 3π/8-shifted 8PSK that is used in GSM/EDGE systems. For the transmission of a baseband signal that includes desired information, or symbols, a carrier signal is modulated by the baseband signal according to the modulation format, and filtered to limit the bandwidth. A discussion about such a transmission system is included in the Application Note 1298 provided by Agilent Technologies at http://cp.literature.agilent.com/litweb/pdf/5965-7160E.pdf. The characteristics of the bandwidth limiting filters used are different according to the particular modulation format. The GSM/EDGE system uses a Gaussian filter, for example, while other formats use a raised-cosine filter. The modulated carrier signal received by a receiver is down-converted to an intermediate frequency and then demodulated to produce I and Q component values for each symbol as well as a symbol clock. See Application Note 1314 provided by Agilent Technologies at http://cp.literature.agilent.com/litweb/pdf/5968-3579E.pdf.

Such a wireless communication system also requires signal test and measurement methods to assure quality of service. See Application Note 1313 provided by Agilent Technologies at http://cp.literature.agilent.com/litweb/pdf/9568-3578E.pdf. One such method is the use of a constellation diagram of the symbols on an IQ coordinate plane. Such a diagram or constellation display may indicate distortions due to noise or non-linearity of components in the system. FIG. 1 is a vector trajectory of symbols for the period of one burst length on an IQ coordinate plane according the 3π/8-shifted 8PSK modulation format, while FIG. 2 shows the symbols on a corresponding constellation display. The symbol locations are decided by sampling the I and Q components of a received signal according to the symbol clock.

FIG. 3 shows a relationship between an impulse response of an I or Q component and a symbol clock for the GSM/EDGE system. As mentioned above the GSM/EDGE system uses a Gaussian filter so the impulse response of the I or Q component of one symbol appears as a Gaussian curve. The symbol clock is phase locked to the peak of the impulse response, and the peak amplitudes of the impulse responses are sampled to decide the I or Q component values of the symbols, as shown at S2. In this case inter-symbol interference (ISI) exists at the points S1 and S3. The sampled I and Q component values of the symbols are displayed as shown in FIG. 2. If non-linearity and phase distortion exist, the symbol values shift radially and angularly respectively.

FIG. 4 shows another example of a relationship between an impulse response of an I or Q component signal and a symbol clock where the modulation format, such as 8PSK, uses a raised-cosine filter. This filter ideally does not cause ISI because there are no magnitudes except at the sample point S2. At all other symbol clocks the values are zero, as shown by points S0, S1, S3 and S4. Similar to the case for thef GSM/EDGE system, the sampled symbols may be presented in a constellation display for observing distortions included in the modulated signal.

The constellation display has some difficulty in observing distortions. For example FIG. 5 shows a constellation display of all possible symbols for the GSM/EDGE system that has more symbols than are shown in FIG. 2. FIG. 6 shows the same number of symbols as FIG. 5, but there are distortions due to non-linearity of the modulated signal. Even if more symbols are displayed, it may be difficult to clearly recognize the distortions at a glance because the symbols are sprinkled over the IQ coordinate plane.

U.S. Pat. No. 4,825,449 (McKissock) discloses a quantitative analysis of errors in a modulated signal which introduces the concept of error vectors. The error vector indicates the vector difference between an ideal and an actual vector for the symbols from the origin of the IQ coordinate plane. It provides an amount of the distortions of the signal under test. It may suggest that there is an error, but it is not clear what factor is the cause of the error. The user cannot recognize whether the error factor is due to noise or non-linearity in the system.

What is desired is an improved display for providing better observability of signal distortions in a modulated signal and the factors contributing thereto.

BRIEF SUMMARY OF THE INVENTION

Accordingly the present invention provides a half-symbol constellation display for readily providing better observability of signal distortions in a modulated signal. A sample clock is derived from the symbol clock, i.e., having the same period, but shifted one-half period with respect to the phase of the symbol clock. The quadrature component signals (generally denoted I and Q) of the modulated signal are sampled by the sample clock to produce sample pairs, referred to as pseudo-symbols, that are symmetric about a symbol sample point. The pseudo-symbols form a plurality cluster when displayed on an IQ coordinate plane, with the diameter of each cluster being determined by the outer sample pair of the corresponding pseudo-symbols. The circumferences of such clusters for an ideal modulated signal may be displayed as templates to make it easier to recognize the shift of the pseudo-symbols from the ideal locations due to distortions in the modulated signal. The clusters make it easy to recognize the distortions and the contributing factors, such as noise and non-linearity of components in the wireless communication system. If clusters are compressed radially and/or cluster locations are shifted from ideal locations, then distortion is present in the modulated signal. For noise the pseudo-symbols spread concentrically from the ideal pseudo-symbol locations, and for non-linearity the center of each pseudo-symbol cluster shifts from the center of the corresponding ideal location. For a quantitative measurement of the distortions, the ratio of pseudo-symbols outside to ideal clusters to the total number of pseudo-symbols may be used. Ideally the pseudo-symbol arrangement in one cluster is similar to that of the clusters on the half-symbol constellation display so that zooming in on a cluster provides an indication of whether the modulated signal is ideal or not.

The objects, advantages and other novel features of the present invention are apparent from the following detailed description when read in conjunction with the appended claims and attached drawing.

BRIEF DESCRIPTION OF THE SEVERAL VIEWS OF THE DRAWING

FIG. 13 is a half-symbol constellation display view showing pseudo-symbols for an 8PSK modulated signal filtered by a raised-cosine filter having a larger than usual roll-off factor according to the present invention.

FIGS. 14a and 14b is a half-symbol constellation display view and partially zoomed view showing an ideal pseudo-symbol cluster diagram according to the present invention.

DETAILED DESCRIPTION OF THE INVENTION

To observe distortions, such as noise and non-linearity of components, in a modulated signal for a wireless communication system, clusters of pseudo-symbols are displayed on an IQ coordinate plane in the form of a half-symbol constellation display. With such a display the distortions are readily observed at a glance.

Figure 1:
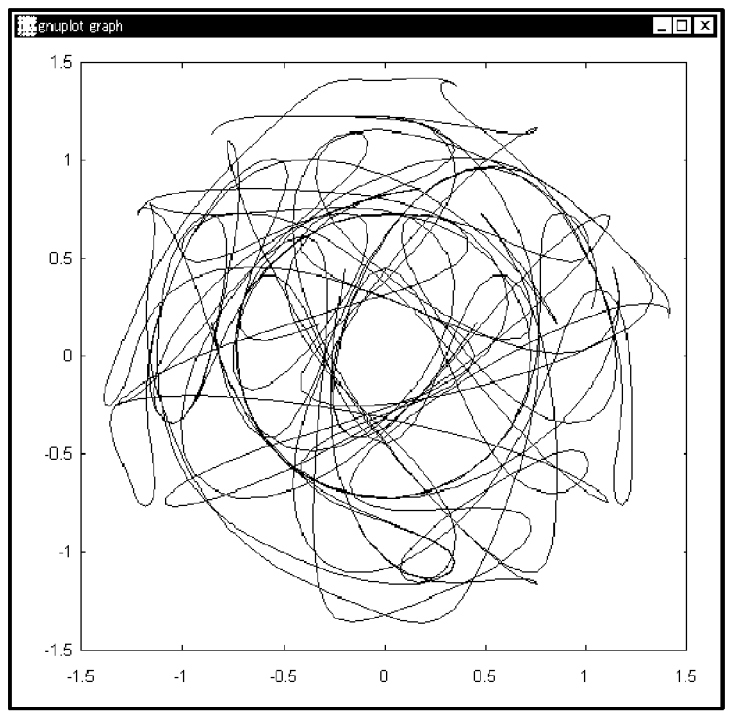
FIG. 1 is a vector diagram view of a trajectory of a GSM/EDGE modulated signal on an IQ coordinate plane.
Figure 2:
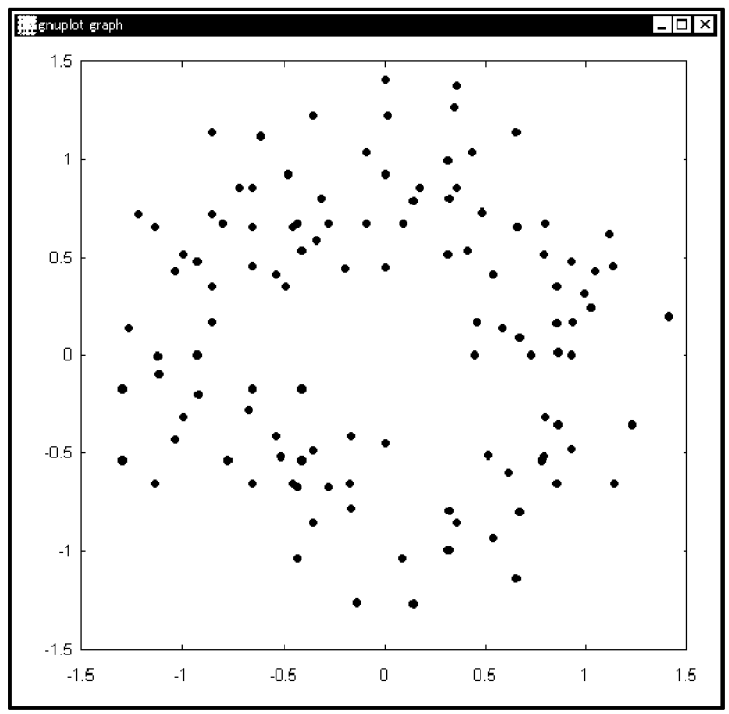
FIG. 2 is a prior art constellation display view indicating symbols for the vector diagram of FIG. 1.
Figure 3:
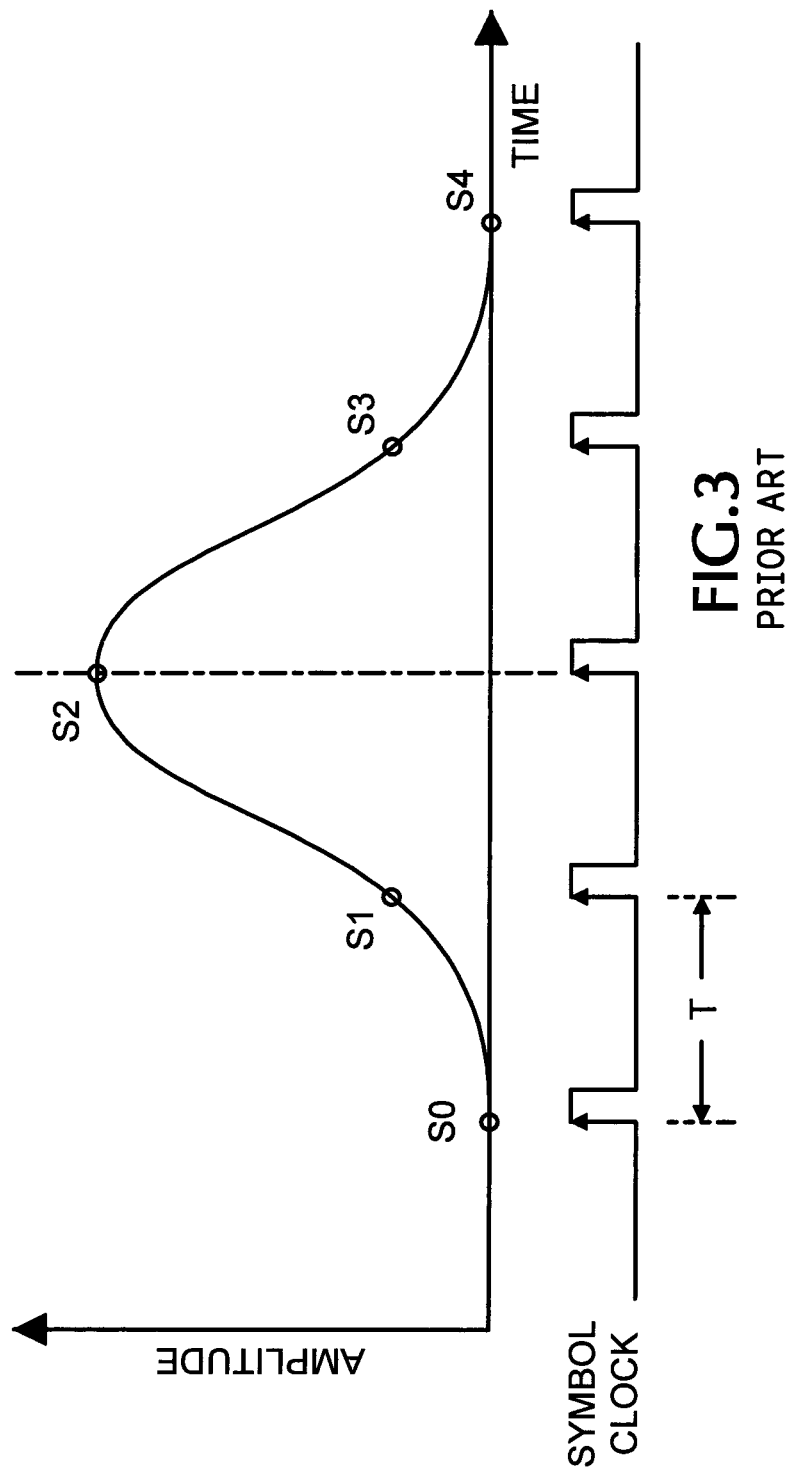
FIG. 3 is a conventional timing diagram view showing a relationship between a symbol clock and an impulse response of an I or Q component signal for a GSM/EDGE modulated signal which is filtered by a Gaussian filter.
Figure 4:
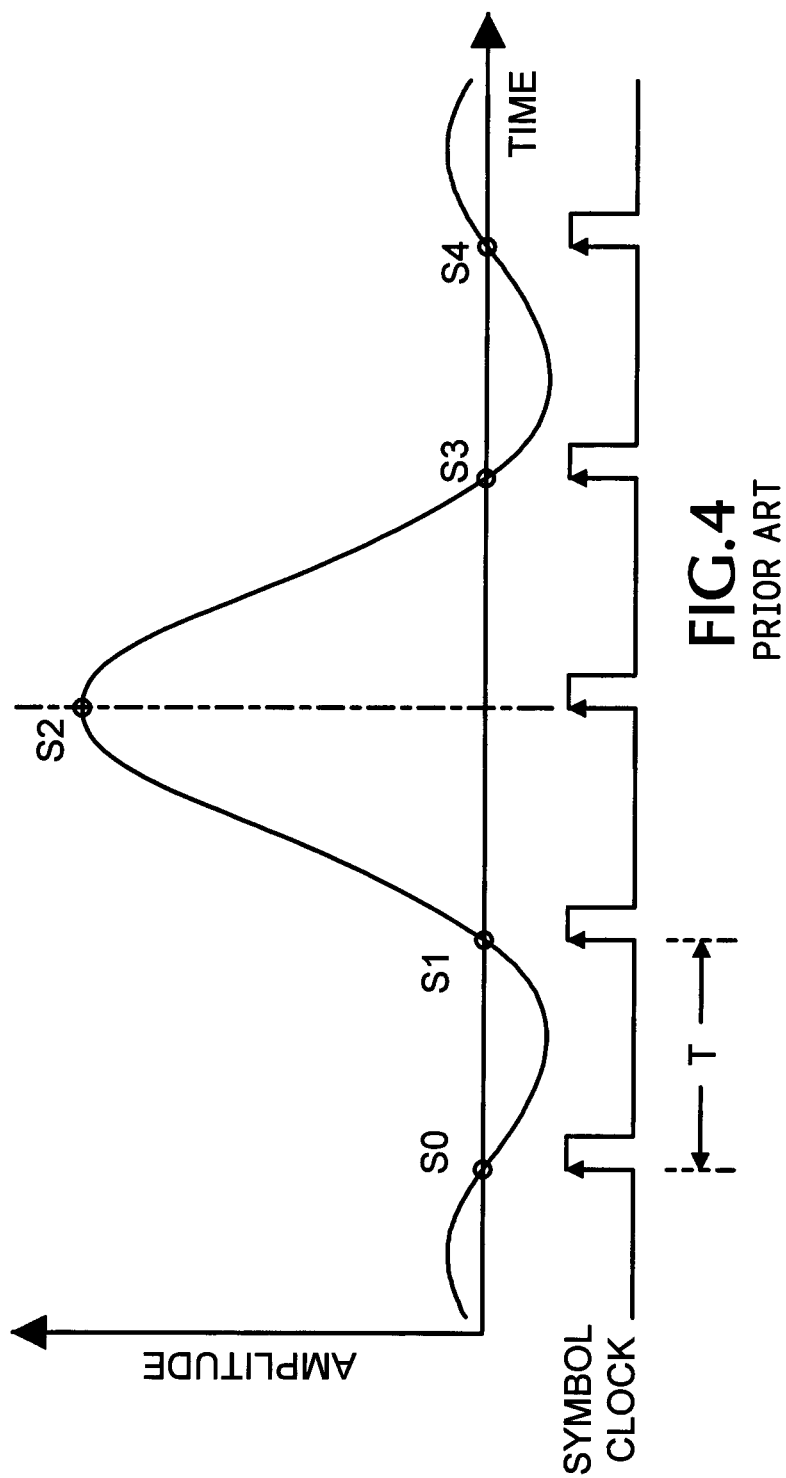
FIG. 4 is a conventional timing diagram view showing a relationship between a symbol clock and an impulse response of an I or Q component signal for a modulated signal which is filtered by a raised-cosine filter.
Figure 5:
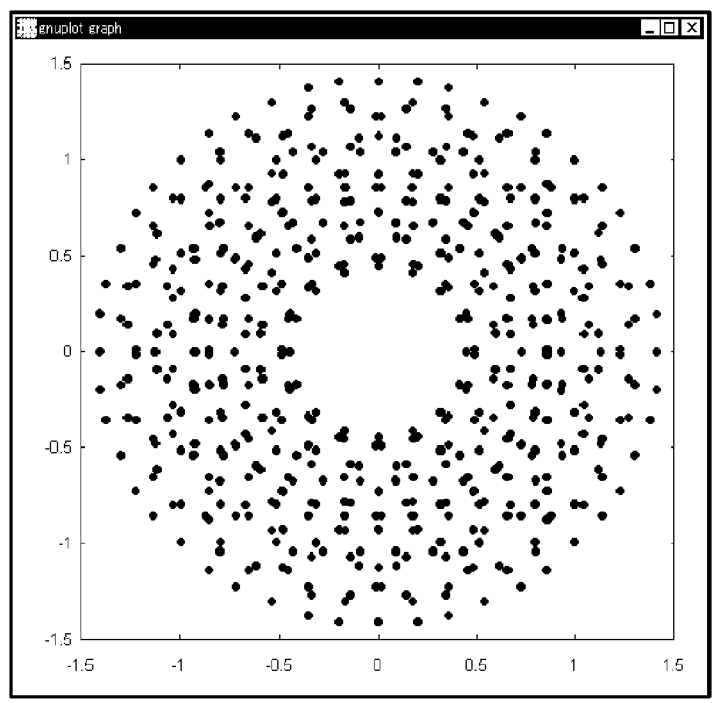
FIG. 5 is another prior art constellation display view having more symbols than shown in FIG. 2.
Figure 6:
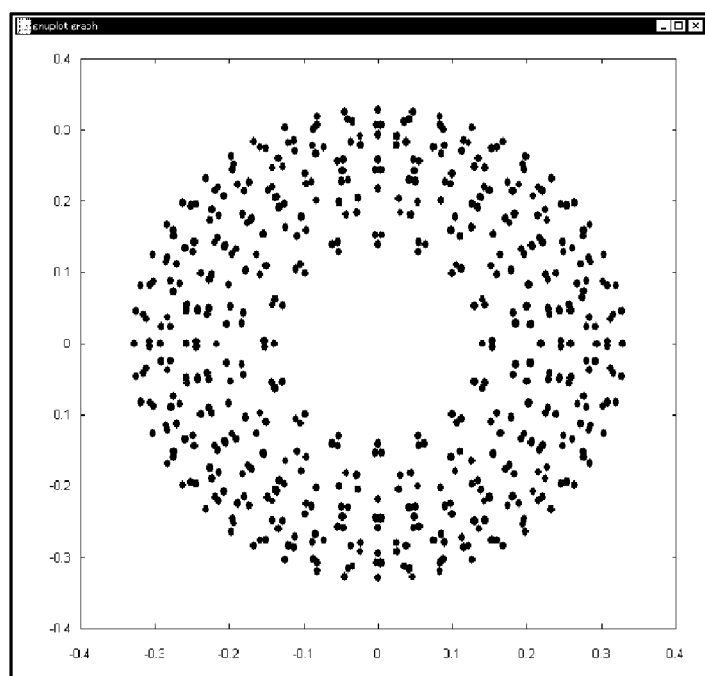
FIG. 6 is another prior art constellation display view showing the signal of FIG. 5 with distortions.
Figure 7:
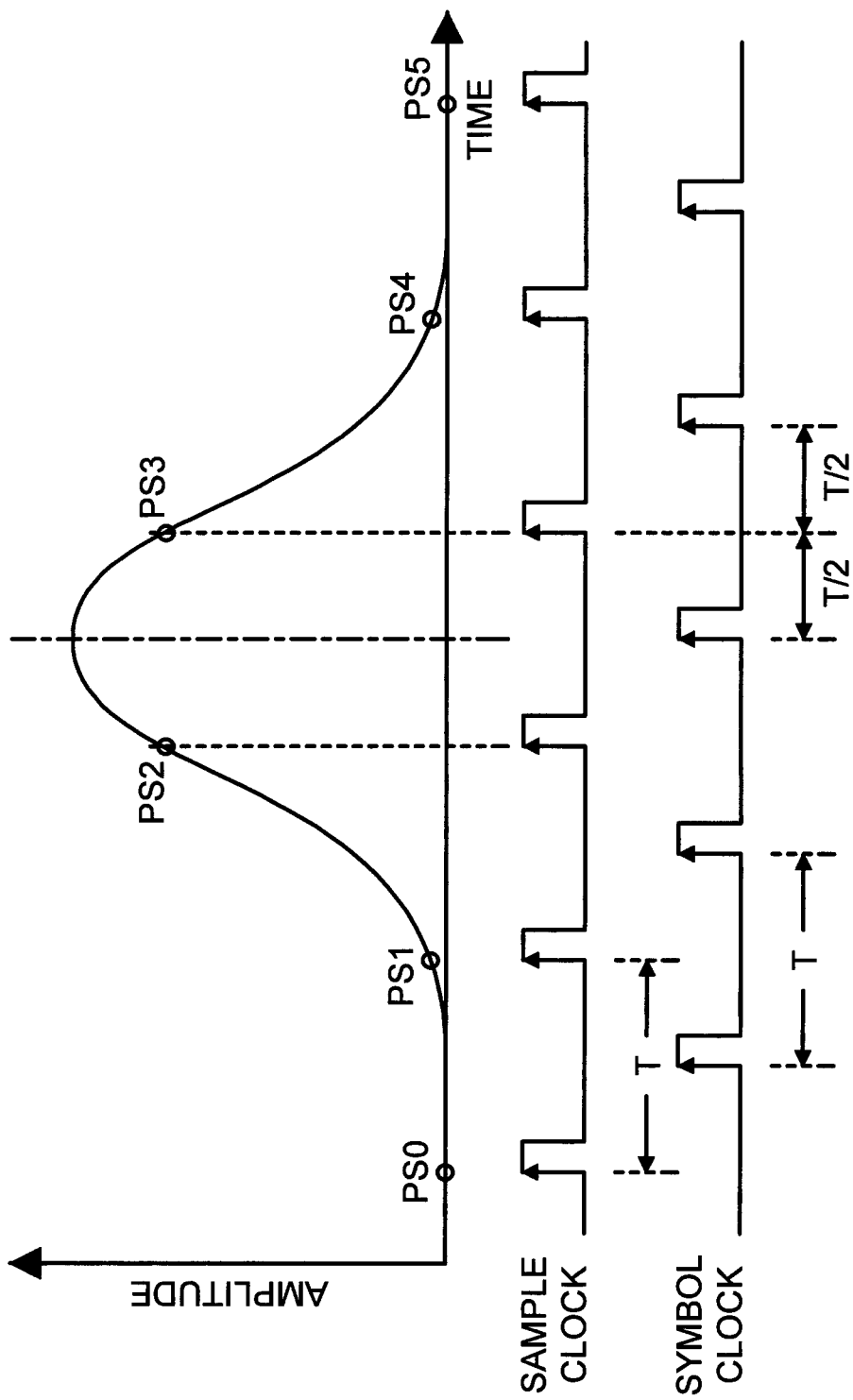
FIG. 7 is a timing diagram view showing a relationship between a sample clock and an impulse response of an I or Q component signal for a GSM/EDGE modulated signal according to the present invention.

A modulated signal is sampled to produce symbols according to a sample clock during demodulation. However rather than being phase locked to the symbol sample points, i.e., the peak points of the filter symmetric impulse response, a sample clock having the same period as the symbol clock is phase shifted by one-half period relative to the phase of the symbol clock. Therefore the samples do not agree with the true quadrature (I and Q) component values of the symbol, but are pairs of symmetric samples about the true values. FIG. 7 shows the relationship between the sample clock, the symbol clock and an impulse response for the I or Q component value of a modulated signal. The I and Q component values of the symbol are sampled separately in the same manner. For example samples PS2 and PS3 nearest the peak have the same values and a symmetric relationship with respect to the peak. The half period shift causes this symmetric relationship, and produces a plurality of symmetric pairs to the peak amplitude. For 3π/8-shifted 8PSK two pairs of two points PS1, PS4 and PS2, PS3 are sampled from the I and Q components of one symbol by the half period shifted sample clock. These samples do not indicate an I or Q component value of the symbol, but the sampling process is similar. Therefore these samples are called "pseudo-symbols."

Figure 8:
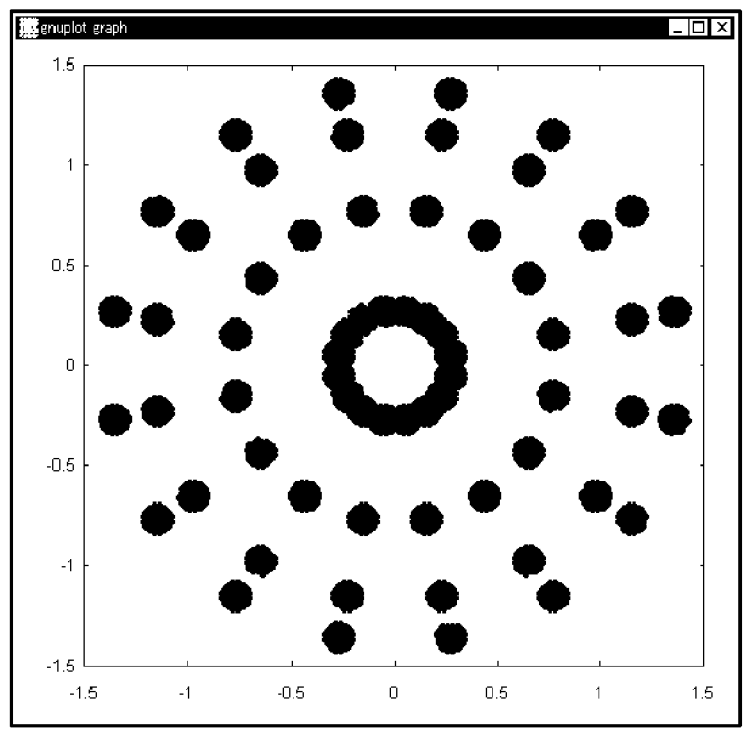
FIG. 8 is a half-symbol constellation display view showing clusters of pseudo-symbols derived from an ideal modulated signal according to the present invention.
Figure 9:
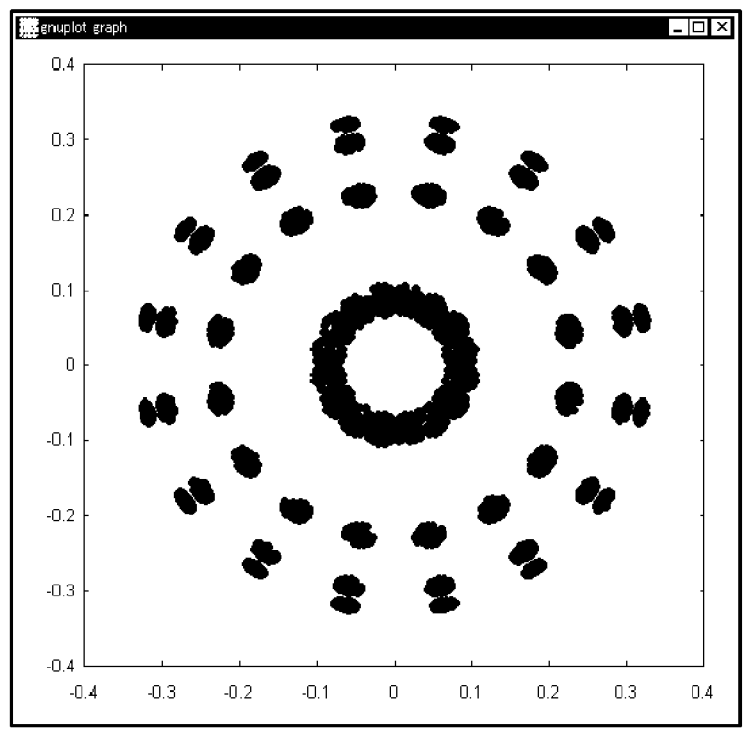
FIG. 9 is a half-symbol constellation display view showing a distorted version of the ideal modulated signal of FIG. 8 according to the present invention.

FIG. 8 illustrates one embodiment of displaying pseudo-symbols with a plurality of clusters of the pseudo-symbols being shown in their ideal locations. Referring to FIG. 7 the samples PS1 and PS4 define the diameter of the cluster, while PS2 and PS3 determine the location. On the other hand FIG. 9 illustrates a distorted version of the modulated signal shown in FIG. 8. Here a larger amplitude leads to more compressed clusters in the radial direction as well as the cluster locations being shifted angularly from the ideal locations. In other words non-linearities of the wireless communication system that affect the modulated signal are displayed on the IQ coordinate plane as location and shape distortions of the clusters. A user can readily recognize these distortions on the display at a glance. If there is noise in the signal, then the pseudo-symbols spread concentrically from the ideal pseudo-symbol locations. If these is no non-linearity in the system, the center of each pseudo-symbol cluster shifts from the center of the corresponding ideal location. Thus the user can readily recognize the factors causing the distortions on the display.

Figure 10:
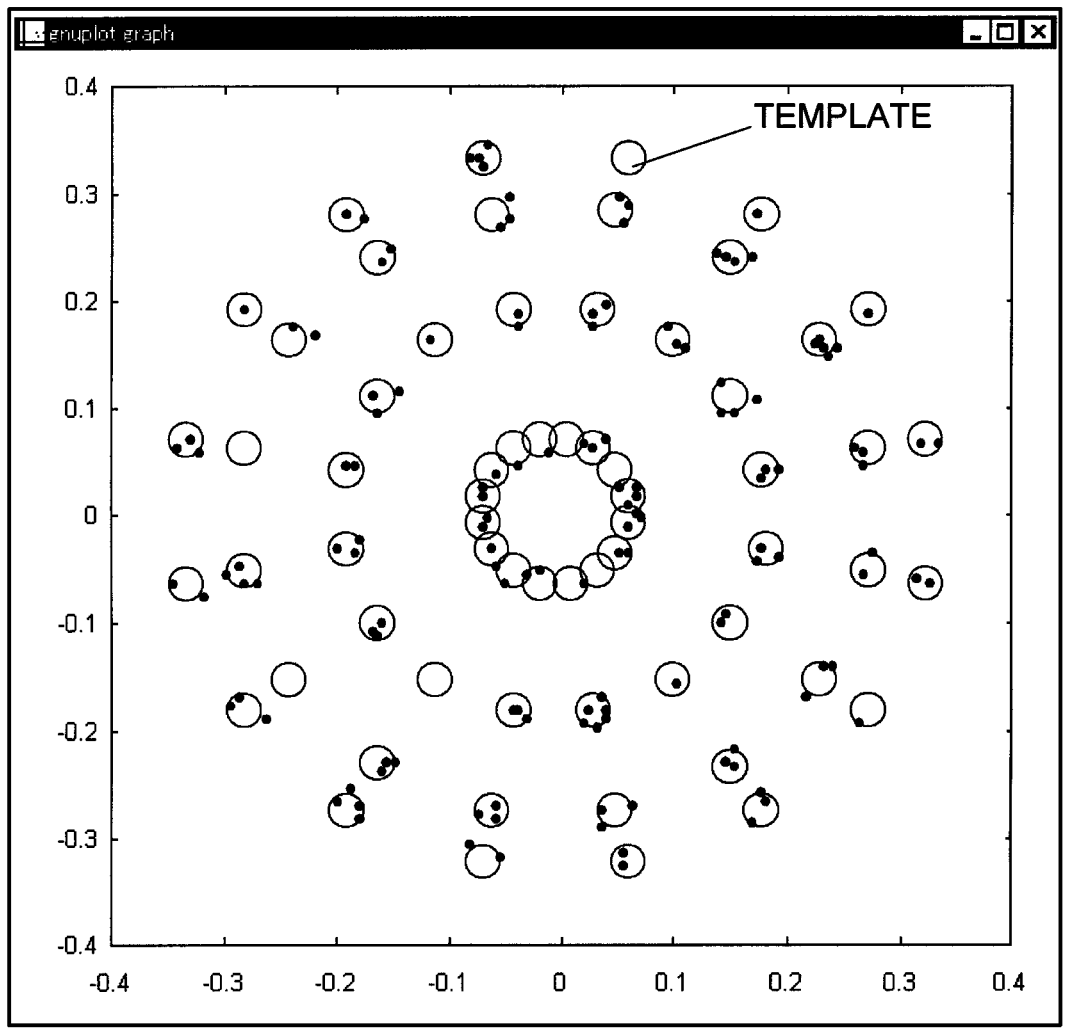
FIG. 10 is a half-symbol constellation display view showing pseudo-symbols overlaid with cluster templates indicating ideal locations for the clusters according to the present invention.

FIG. 10 illustrates another embodiment where the circumferences of ideal clusters of pseudo-symbols are introduced as templates for evaluating the distortions included in the signal. The circumferences of the ideal clusters are previously calculated to have desired area sizes. From FIG. 7 ideal pseudo-symbols PS1 and PS4 determine the diameter of each cluster circumference in the template. The pseudo-symbols derived from a modulated signal are overlaid on the cluster templates.

The pseudo-symbols inside or outside the templates may be counted to get a quantitative index on the distortion so the user can evaluate how much the signal is distorted. The ratio of the outside number to the total number of pseudo-symbols may be used as the distortion index.

The described half-symbol phase shifting for sampling is preferable to a modulation system using only symmetric impulse response filters such as Gaussian and raised-cosine filters. However to obtain clear individual clusters parameters for the filters, such as roll-off or sharpness (α) for raised-cosine filters and bandwidth-time (BT) product for Gaussian filters, should be selected so that ISI is decreased. In other words it is better that the roll-off or the BT product be adjusted larger than those of the usual communication system (where α typically ranges from 0.35 to 0.5 and BT values range from 0.3 to 0.5) to reduce the ISI and not to sprinkle the pseudo-symbols.

Figure 11:
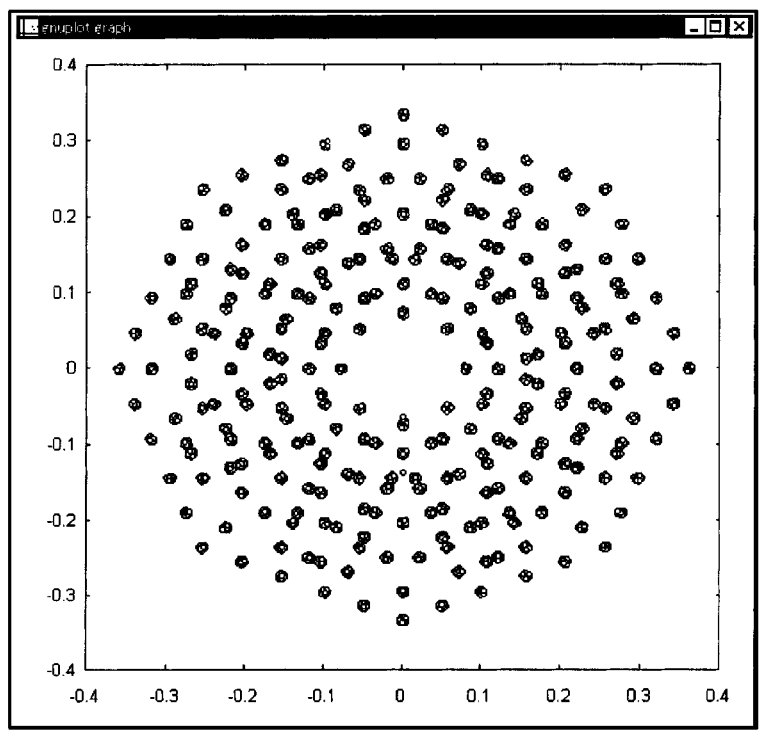
FIG. 11 is a prior art constellation display view for an 8PSK modulated signal using a Gaussian filter instead of a raised-cosine filter.
Figure 12:
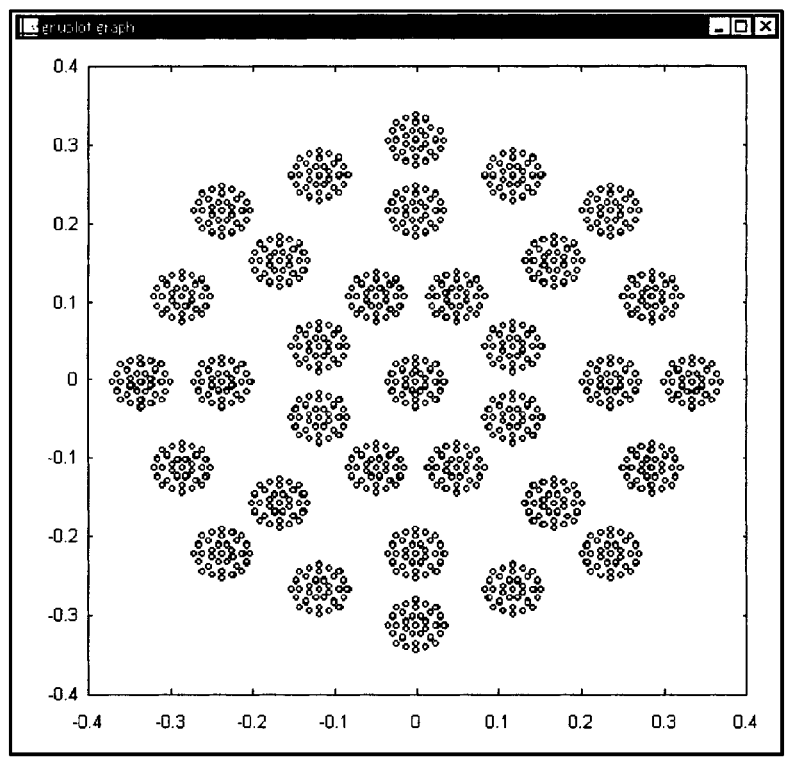
FIG. 12 is a half-symbol constellation display view showing pseudo-symbols for an 8PSK modulated signal using a Gaussian filter according to the present invention.

FIG. 11 illustrates an 8PSK modulated signal filtered by a Gaussian filter with a BT product of 0.2 and sampled using the symbol clock, whereas FIG. 12 shows the same signal sampled using a sample clock one-half phase shifted from the symbol clock to generate pseudo-symbols. Similar to the above description if there is noise in the modulation signal, the pseudo-symbols spread concentrically from the ideal pseudo-symbol locations. If there is non-linearity in the system, the center of each pseudo-symbol cluster shifts from the center of the corresponding ideal pseudo-symbol cluster.

FIG. 13 is another illustration of an 8PSK modulated signal filtered by a raised-cosine filter with a roll-off, α, of 0.7 and sampled by the phase shifted sample clock. The roll-off is different from and larger than the usual value for communication systems, but the value is adjusted to be suitable for measuring distortions. The 8PSK modulated signal may be previously stored as digital data in a memory of a receiver for this analysis and calculation. As shown in FIG. 13 pseudo-symbols constitute clusters so that the user can readily observe the distortions involved in the signal, as mentioned above.

FIG. 14a is a partial zoom view of the ideal pseudo-symbol cluster diagram of FIG. 14b showing that the pseudo-symbols in a cluster in FIG. 14a have a similar arrangement to the clusters shown in 14b. This self-similarity occurs when there is no distortion in the signal, so the user can judge whether the system is in an ideal condition or not.

Figure 15:
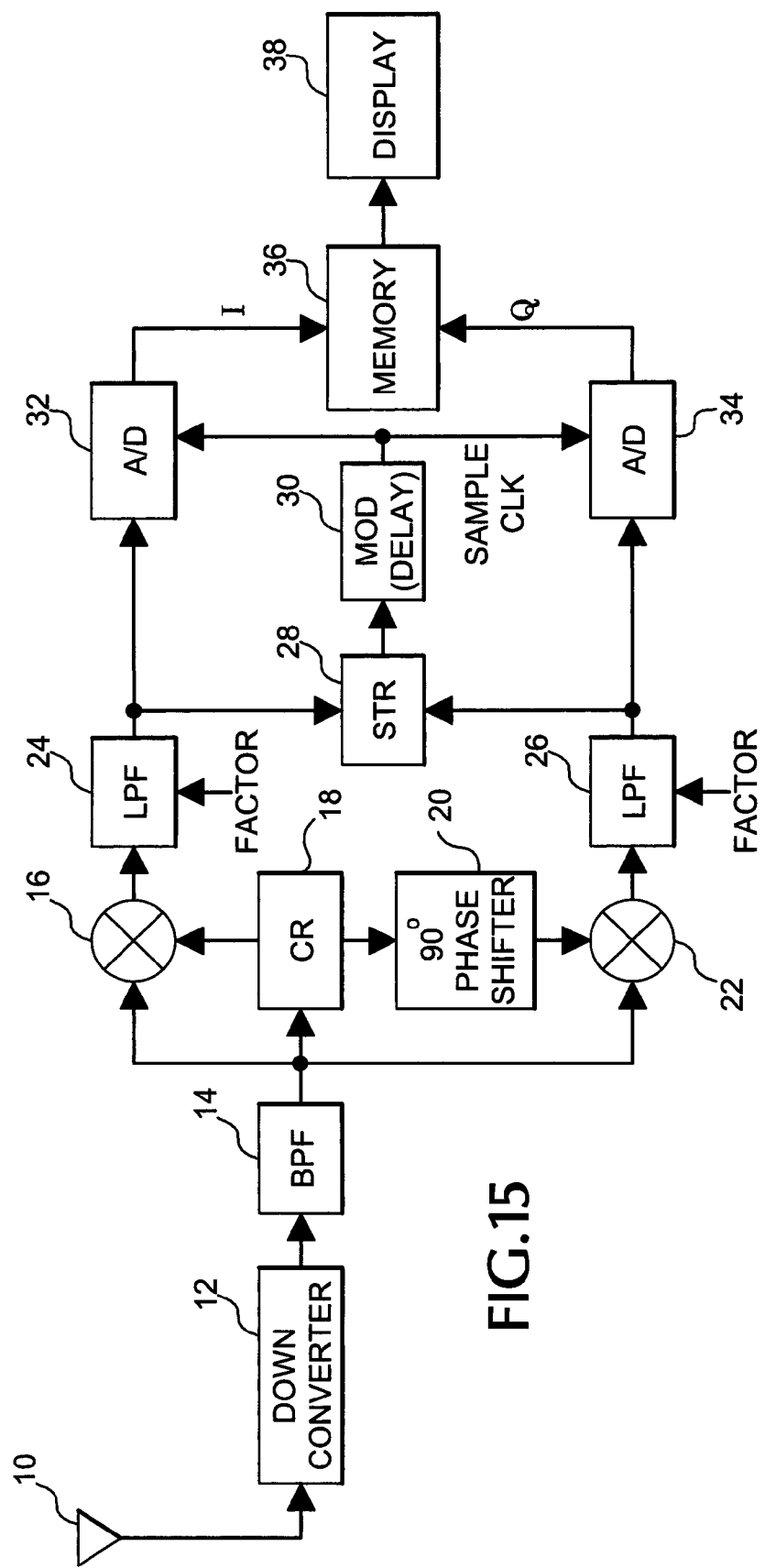
FIG. 15 is a block diagram view of a receiver for providing the half-symbol constellation display according to the present invention.

FIG. 15 shows a typical receiver of a modulated signal as modified according to the present invention. The modulated signal is received at an antenna 10 and shifted in frequency by a down converter 12. The downconverted signal is then filtered by a bandpass filter 14, the output of which is input to respective quadrature demodulators 16, 22 and a carrier recovery (CR) circuit 18. The recovered carrier frequency is used to demodulate the filtered modulated signal in the demodulators 16, 22, with the carrier frequency being shifted by a 90° phase shifter 20 before being applied to one of the demodulators. The respective demodulated outputs are filtered by lowpass filters 24, 26, and the filtered signals are digitized by analog-to-digital (A/D) converters 32, 34 before being stored in memory 36 as quadrature (I and Q) component values. The sample clock for the A/D converters 32, 34 is provided from a symbol timing recovery (STR) circuit 28 that generates from the filtered signals a symbol clock. So far the receiver described is conventional. See page 142 of "Wireless Digital Communications" by Kamilo Feher, Prentice-Hall, May 17, 1995.

However to implement the present invention a delay module 30 is inserted between the STR circuit 28 and the A/D converters 32, 34 to provide the sample clock which has the same period as the symbol clock but is delayed in phase with respect to the symbol clock by one-half period. Also added is a parameter control for the lowpass filters 24, 26 to control the BT products if the filters are Gaussian or the roll-off if the filters are raised—cosine. A display 38 receives the I and Q component values, or the pseudo-symbols, from the memory to produce the half-symbol constellation display. In current receivers most of the elements of the receiver usually are implemented using digital processing, and the modulated signal may be stored in another memory (not shown) as digital data and provided to the digital down converter 12 from such memory. The template may be pre-calculated and stored in the memory 36 for display with the pseudo-symbols. Further a processor (not shown) may access the memory 36 to compute the distortion index as described above.

Figure 16:
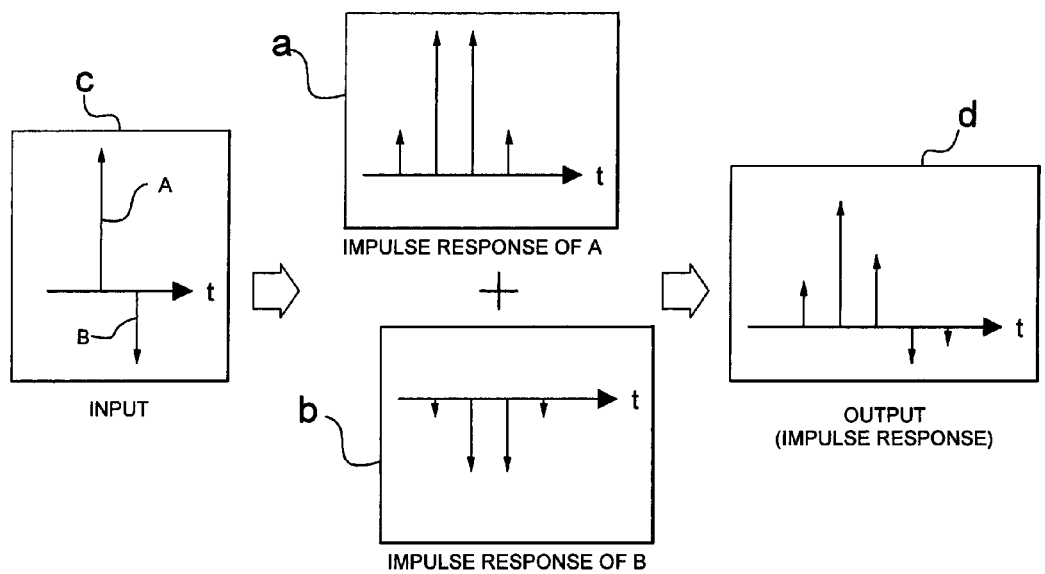
FIG. 16 is a graphic view of inter-symbol interference.

The clusters are constituted by intentionally using the effect of ISI. The output from either A/D converter 32, 34 is considered to be a convolution of a plurality of impulse responses of the respective lowpass filters 24, 26, as shown in FIG. 16. FIG. 16c shows input impulses and FIG. 16d shows the impulse response according to the characteristics of the lowpass filters 24, 26. Adjacent impulse responses A and B of the input impulses are shown having a phase difference of one symbol clock. FIGS. 16a and 16b show the impulse responses of the input pulses A and B respectively. The resultant impulse response of FIG. 16d is a convolution or composition of the impulse responses A and B. This suggests that, if the impulse response of the lowpass filter 24, 26 has a plurality of input impulses, ISI occurs.

Figure 17:
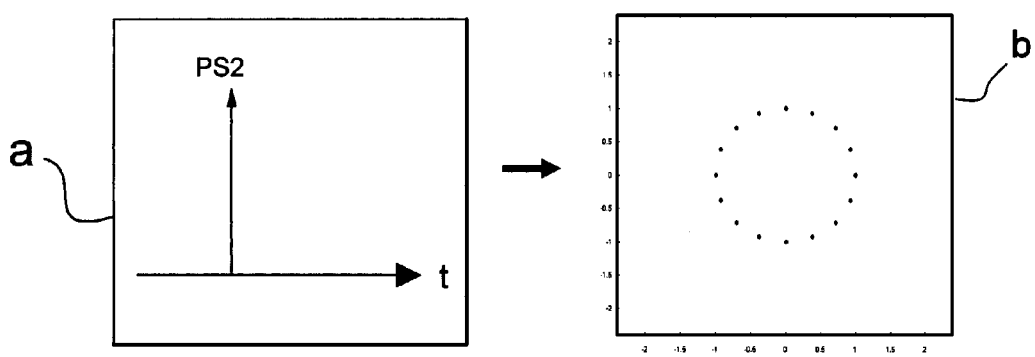
FIG. 17 is a graphic view of an impulse response without inter-symbol interference.
Figure 18:
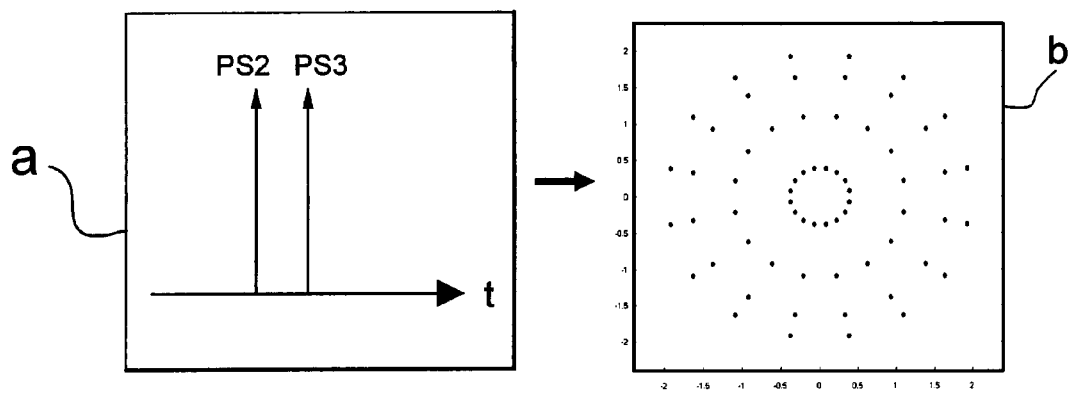
FIG. 18 is a graphic view of an impulse response with two data samples according to the present invention.
Figure 19:
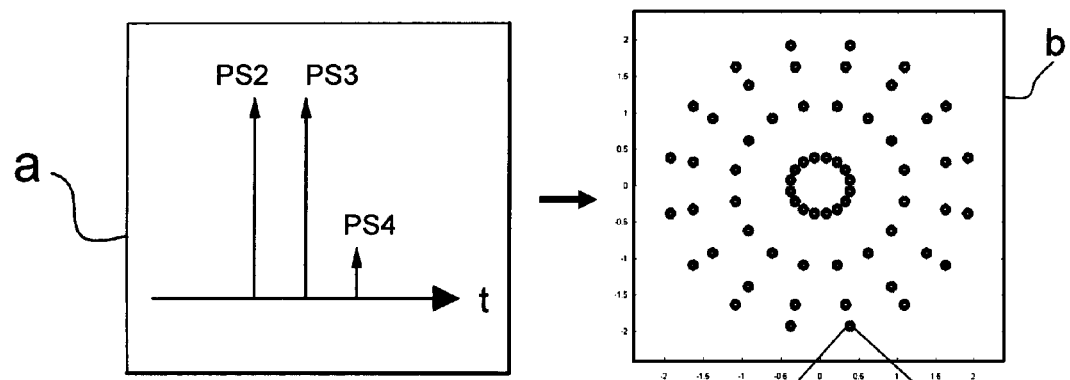
FIG. 19 is a graphic view of an impulse response with three data samples according to the present invention.
Figure 20:
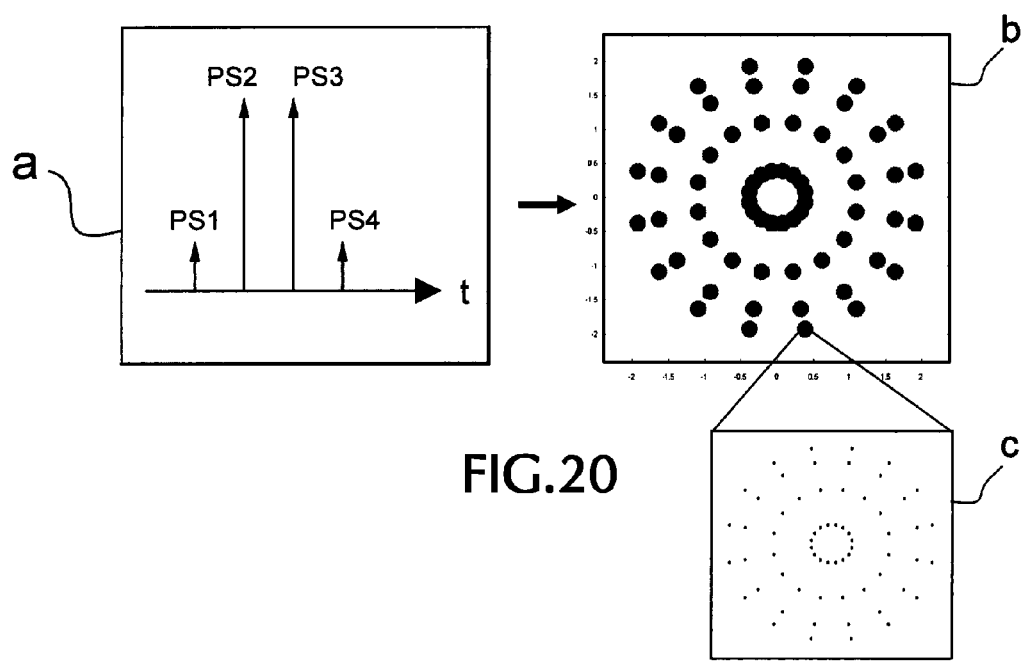
FIG. 20 is a graphic view of an impulse response with an outside pair of pseudo-symbols according to the present invention.

Therefore if, as shown in FIG. 17a, the impulse response only has one impulse, then ISI does not exist and only 16 points are plotted in the IQ coordinate plane in the case of 3π/8-shifted 8PSK, as shown in FIG. 17b. If there are two data samples of the same magnitude in one impulse response, i.e., symmetrical input impulses as shown in FIG. 18a, four layers of 16 points are plotted, as shown in FIG. 18b, but clusters do not occur. If there is an outside pseudo-symbol PS4 of suitable amplitude as shown in FIG. 19a, then clusters occur with diameters dependent on the amplitude of the outside pseudo-symbol. Each cluster has 16 pseudo-symbols as shown in FIG. 19c. If there is an outside pair of pseudo-symbols PS1 and PS4 of suitable amplitudes as shown in FIG. 20a, clusters occur, as shown in 20b, with the diameters being a function of the amplitudes of the outside pair of pseudo-symbols.

In the case of 3π/8-shifted 8PSK each cluster has four layers of 16 pseudo-symbols having locations similar to those of the clusters, or four layers of 16 clusters as shown in 20c. Using this feature the circumference of the template clusters (FIG. 10) are calculated by a control unit (not shown) based on ideal pseudo-symbols. Therefore, the outside pairs of pseudo-symbols play an important role in providing the clusters. However if the amplitudes of the outside pairs of pseudo-symbols relative to the input pairs are too large, the pseudo-symbols are sprinkled since the diameters of the clusters become too. This problem is addressed by properly adjusting the characteristics of the lowpass filters 24, 26 by changing the BT product or roll-off, as mentioned above.

Thus the present invention provides a half-symbol constellation display for readily recognizing distortions in a modulated signal for wireless communication systems as well as recognizing contributing factors—noise or non-linearity—by sampling the quadrature components with a sample signal that is the symbol clock shifted by one-half period in phase, and by displaying the resulting symmetric pairs of pseudo-symbols as clusters on an IQ coordinate plane.

What is claimed is:

1. An apparatus for displaying a modulated signal representing symbols of information to observe distortions comprising:
   means for deriving quadrature component signals and a symbol clock from the modulated signal;
   means for generating a sample clock having a period equal to the symbol clock, the sample clock being shifted one-half period in phase with respect to the symbol clock;
   means for sampling the quadrature component signals with the sample clock to produce pseudo-symbols as pairs of pseudo-symbols about a symbol sample point for each symbol; and
   means for displaying the pseudo-symbols on a quadrature coordinate plane.

2. The apparatus as recited in claim 1 further comprising means for generating a template for the displaying means representing an ideal modulated signal.

3. The apparatus as recited in claim 2 further comprising means for determining a distortion index as a function of the number of pseudo-symbols that are outside the template.

4. The apparatus as recited in claim 2 wherein the template comprises a plurality of circles representing clusters of the pseudo-symbols for each symbol of the ideal modulated signal.

5. The apparatus as recited in claim 4 wherein each circle comprises a cluster outline having a diameter that is a function of an outer pair of pseudo-symbols for the corresponding symbol of the ideal modulated signal.

6. The apparatus as recited in claim 1 wherein the displaying means comprises means for zooming in on individual clusters of pseudo-symbols to observe whether the arrangement of pseudo-symbols in the cluster is similar to the arrangement of clusters on the quadrature coordinate plane.

\* \* \* \* \*